(12) United States Patent
Metzler et al.

(10) Patent No.: US 10,950,054 B2
(45) Date of Patent: Mar. 16, 2021

(54) SEAMLESS BRIDGING AR-DEVICE AND AR-SYSTEM

(71) Applicant: HEXAGON TECHNOLOGY CENTER GMBH, Heerbrugg (CH)

(72) Inventors: Bernhard Metzler, Dornbirn (AT); Martin Havnør, Oslo (NO)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 16/005,563

(22) Filed: Jun. 11, 2018

(65) Prior Publication Data

US 2018/0357828 A1 Dec. 13, 2018

(30) Foreign Application Priority Data

Jun. 12, 2017 (EP) ..................................... 17175588

(51) Int. Cl.
*G06T 19/00* (2011.01)
*G06T 7/70* (2017.01)
(Continued)

(52) U.S. Cl.
CPC .......... *G06T 19/006* (2013.01); *G01C 15/002* (2013.01); *G06F 3/011* (2013.01);
(Continued)

(58) Field of Classification Search
CPC ................................ G06T 19/006; G06T 7/00
See application file for complete search history.

(56) References Cited

U.S. PATENT DOCUMENTS

2011/0169861 A1* 7/2011 Suzuki .................. G06T 19/006
   345/632
2011/0234879 A1  9/2011 Kashitani
   (Continued)

FOREIGN PATENT DOCUMENTS

CN  102200881 A  9/2011
CN  102395997 A  3/2012
   (Continued)

OTHER PUBLICATIONS

European Search Report in application No. 17 17 5588 dated Oct. 31, 2017.

*Primary Examiner* — Yi Yang
(74) *Attorney, Agent, or Firm* — Maschoff Brennan (57) ABSTRACT

An Augmented Reality (AR)-device, including a visual sensor for capturing an environment of the AR-device, a display providing a real view of the environment, and overlays onto the real view according to AR-data including at least one of design data and measured data, a computer for reading and controlling the visual sensor, at least one of receiving, generating and storing the AR-data, and identification features which are assigned to each of a plurality of reference systems, generating the overlays, establishing a referenced status of the AR-device relative to each of the reference systems by identifying a reference system based on at least one identification feature captured by the visual sensor, determining a pose of the AR-device relative to the identified reference system, and maintaining the referenced status in case of loss of visual contact between the visual sensor and the identification feature, based on a Visual Localisation and Mapping (VSLAM)-process.

16 Claims, 4 Drawing Sheets

(51) Int. Cl.
*G06K 9/00* (2006.01)
*G06F 3/01* (2006.01)
*G06T 7/292* (2017.01)
*G01C 15/00* (2006.01)
*G06T 7/73* (2017.01)
*G01C 1/00* (2006.01)

(52) U.S. Cl.
CPC .......... *G06K 9/00671* (2013.01); *G06T 7/292* (2017.01); *G06T 7/70* (2017.01); *G06T 7/73* (2017.01); *G01C 1/00* (2013.01); *G01C 15/00* (2013.01); *G06T 2207/30244* (2013.01)

(56) References Cited

U.S. PATENT DOCUMENTS

| | | |
|---|---|---|
| 2014/0076985 A1 | 3/2014 | Pettersson et al. |
| 2014/0156219 A1* | 6/2014 | Soubra .................. G01C 15/00 702/150 |
| 2014/0306996 A1 | 10/2014 | Cao et al. |
| 2015/0098615 A1 | 4/2015 | Lee et al. |
| 2015/0138236 A1* | 5/2015 | Koga ...................... G06T 11/60 345/633 |
| 2015/0302623 A1* | 10/2015 | Ishikawa .............. G06K 9/2063 345/629 |
| 2015/0309174 A1 | 10/2015 | Giger |
| 2016/0098863 A1* | 4/2016 | Liu ........................ G06T 11/60 345/633 |
| 2016/0350906 A1* | 12/2016 | Meier ..................... G06T 7/579 |

FOREIGN PATENT DOCUMENTS

| | | |
|---|---|---|
| CN | 103153483 A | 6/2013 |
| CN | 104102678 A | 10/2014 |
| CN | 105580029 A | 5/2016 |
| WO | 2010/091875 A2 | 8/2010 |

* cited by examiner

SEAMLESS BRIDGING AR-DEVICE AND AR-SYSTEM

CROSS-REFERENCE TO RELATED APPLICATIONS

This application claims priority to European Patent Application No. 17175588.7 filed on Jun. 12, 2017. The foregoing patent application are incorporated herein by reference.

FIELD OF INVENTION

The present invention relates to an Augmented Reality (AR)-device, system, and method.

BACKGROUND

The technical fields of the present invention are metrology, geodesy and civil engineering. In these arts, Augmented Reality (AR)-systems are often utilised for supporting users on a site by referenced visualisations of AR-data, such as descriptive texts, descriptive numbers, two-dimensional objects, three-dimensional objects, navigational indications, navigational maps, images and/or video clips.

The AR-data need to be overlaid at the correct position on a display of an AR-device, such as within a head-mounted display (HUD) of an AR helmet or within a screen of a tablet computer, so that an observer (the user of the AR-device) perceives the AR-data as being spatially linked to his environment. This causes the reality perceived by the user being augmented with artificial visualisations. For this, however, the AR-device must be referenced with regard to its environment, in particular perpetually referenced by continuously repeating a referencing procedure.

Known referencing procedures are for example image based determinations of the pose of the AR-device relative to a reference system which has a known pose relative to the environment. For example, such pose detections can be achieved by computer vision, in particular image resection.

The reference systems may comprise at least one known identification feature, such as natural or artificial landmarks given by the shape of the environment itself, or markers which are precisely arranged in a pre-defined pose relative to the reference system. By the identification features, the AR-device can not only recognise the reference system but also reference its own pose relative to the reference system by said processing of images of the identification features.

Once locked in into the reference system, the AR-device is able to display the virtual AR-data with a precise spatial link to the reference system, i.e. to the natural environment.

In an environment, however, where a plurality of reference systems exist, and where a user is interacting with more than just one of these reference systems (sequentially or parallel) while travelling through the environment, the user-experience regarding the AR-visualisations using devices and/or systems available on the market is sensitive to inaccuracies and interruptions (e.g. due to loss of line-of-sight to identification features).

BRIEF DESCRIPTION

It is therefore an object of some embodiments of the present invention to provide an AR-device, an AR-system and a method allowing for a more consistent user-experience regarding AR-visualisations. In particular, it is an object to provide an AR-device, an AR-system and a method allowing for a more consistently accurate user-experience regarding AR-visualisations.

The AR-device, the AR-system and the method according to the invention ensure that AR-data are correctly displayed even in case the AR-device is not able anymore to capture identification features assigned to a reference system to which it is referenced. Furthermore, it can guide the user back to the reference system or towards other reference systems around.

Some embodiments of the invention relate to an Augmented Reality (AR)-device, comprising a visual sensor configured for capturing an environment of the AR-device, a display configured for providing a real view of the environment, and overlays onto the real view according to AR-data, wherein the AR-data comprise at least one of design data and measured data, a computer configured for reading and controlling the visual sensor, at least one of receiving, generating and storing the AR-data, and identification features which are assigned to each of a plurality of reference systems, generating the overlays, establishing a referenced status of the AR-device relative to each of the reference systems in each case by identifying a reference system based on at least one identification feature captured by the visual sensor, and determining a pose of the AR-device relative to the identified reference system, and maintaining the referenced status even in case of loss of visual contact between the visual sensor and the at least one identification feature, based on a Visual Localisation and Mapping (VSLAM)-process.

In VSLAM, which is very similar to Structure from Motion (SfM), the trajectory of the device and—often as a side product—the 3D structure of the surrounding environment is determined. The algorithm uses visual correspondences of features detected in images, in particular combined with other sensor data, e.g. inertial measurement units, as input. The correspondences can be established by algorithms like feature tracking or feature matching. Exemplarily, in an alternating process new poses of the AR-device are determined based on corresponding features and 3D-points representing the environment by resection, and new 3D-points are determined based on corresponding features and poses of the device by forward-intersection.

The VSLAM-process and establishing the referenced status are based at least on the output of the visual sensor, i.e. image data captured by the visual sensor.

The AR-device may further comprise a position and orientation sensor configured to provide position and orientation data for the computer, wherein the VSLAM-process is further based on the position and orientation data.

Some embodiments of the invention also relate to an Augmented Reality (AR)-system comprising an AR-device according to the description herein, and at least one surveying instrument, each defining one of the plurality of reference systems. The surveying instrument may e.g. be a total station, theodolite, tachymeter, laser scanner, or laser tracker.

At the least one surveying instrument may be configured to generate and provide to the AR-device: at least one of the AR-data, and the at least one identification feature.

The identification features as mentioned herein may be one or more of image data, a coded marker pattern, landmark coordinates.

Some embodiments of the invention also relate to a method for establishing and seamlessly bridging a referenced status of an Augmented Reality (AR)-device according to the description herein, in particular an AR-device of an AR-system according to the description herein, said method comprising: identifying a first reference system based on at least one of first identification features captured by the visual sensor, by determining a pose of the AR-device relative to the first identification feature, establishing a referenced status of the AR-device with respect to the first reference system, and based on a Visual Localisation and Mapping (VSLAM)-process, maintaining the referenced status even in case none of the at least one first identification feature is visible to the visual sensor.

The method may further comprise: identifying a second reference system based on at least one of second identification features captured by the visual sensor, and by determining a pose of the AR-device relative to the second identification feature, establishing a referenced status of the AR-device with respect to the second reference system.

The method may further comprise: spatially interrelating the first identification features of the first reference system with the second identification features of the second reference system by generating according transformation parameters. In particular, generating the transformation parameters is based on the VSLAM-process. Interrelating two or more reference systems—or respectively: the identification features or the AR-data assigned thereto—is, as a matter of course, useful if the spatial relationship of such reference systems is not known before.

Hence, in case the spatial relation between the reference systems is indeed known already, i.e. transformation parameters are given, all AR-data and the position or pose of according identification features may be transformed forwards and backwards.

The referenced status of the AR-device with respect to the first reference system may be maintained even in case none of the first identification features is visible to the visual sensor, and the referenced status with respect to the second reference system may be maintained even in case none of the second identification features is visible to the visual sensor.

At least one of determining the pose of the AR-device relative to the first identification features, and determining the pose of the AR-device relative to the second identification features may comprise using an image processing algorithm from photogrammetry or computer vision, in particular using a VSLAM-process, i.e. the VSLAM-process as mentioned before or a separate specifically assigned VSLAM-process.

At least one of determining the pose of the AR-device relative to the first identification features and determining the pose of the AR-device relative to the second identification features may comprise using supportive position and orientation data obtained by the position and orientation sensor comprised by the AR-device.

The method may further comprise generating an indication based on at least one of the first indication features, or at least one of the second indication features, the position of the origin of the first reference system or of the second reference system, and providing the indication on the display of the AR-device.

The indication may comprise at least one of an arrow pointing in the direction of an according origin of a reference system or in the direction of an identification feature assigned to an according reference system, and a distance value of the distance between the AR-device and an according origin of a reference system or of the distance between the AR-device and an identification feature assigned to an according reference system.

BRIEF SUMMARY OF THE DRAWINGS

In the following, the invention will be described in detail by referring to exemplary embodiments that are accompanied by figures, in which.

DETAILED DESCRIPTION

Figure 1:
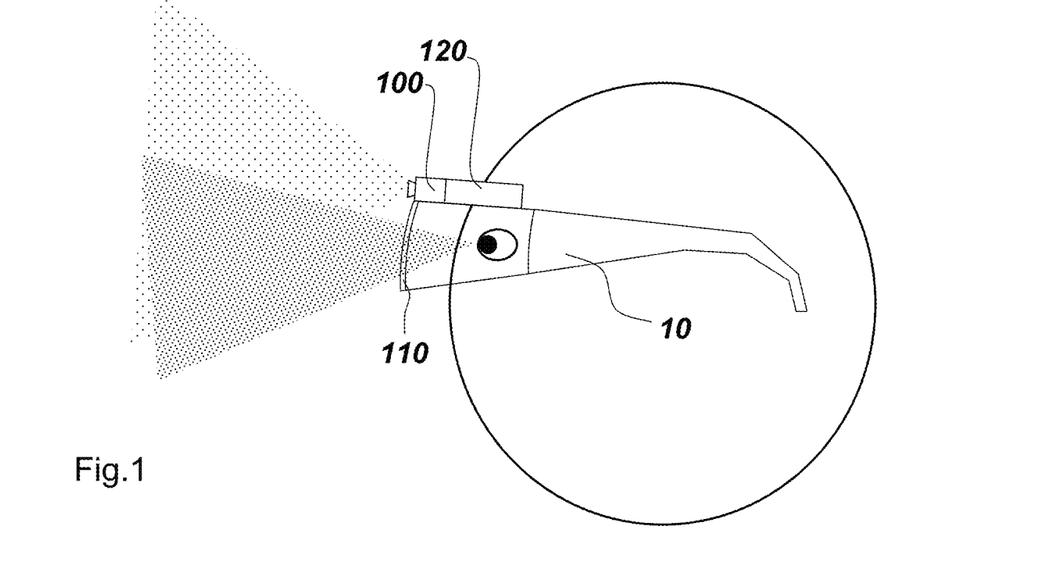
FIGS. 1-2: show a first and a second exemplary AR-device according to the invention.
Figure 2:
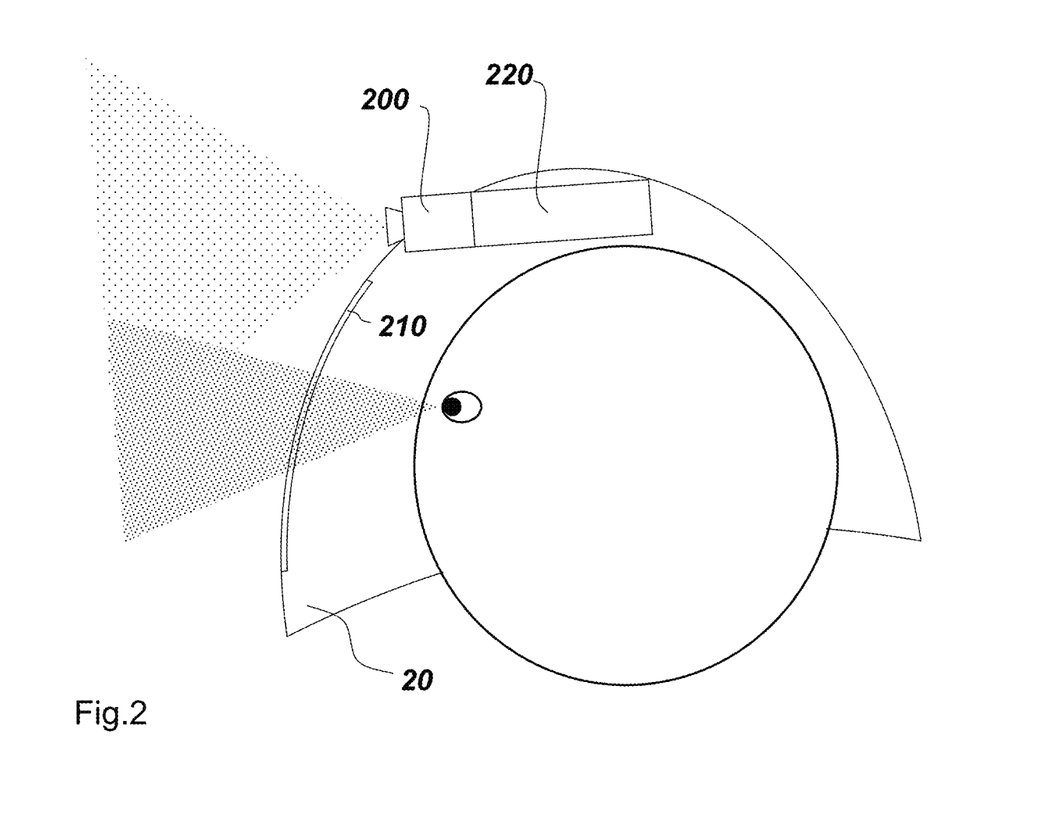

FIGS. 1 and 2 show two embodiments 10, 20 of an Augmented Reality (AR)-device according to the invention, i.e. AR-glasses and an AR-helmet. An AR-device according to the invention comprises a visual sensor 100, 200 (in particular a camera, a panoramic camera, an infra-red camera or a depth camera), a display 110,210 for displaying AR-data, and a computer 120, 220 for controlling the visual sensor and the display. The display shown in the two examples of FIGS. 1 and 2 may comprise a projector for projecting the AR-data onto the display. Other embodiments of the AR-device according to the invention are handheld device such as smart phones or tablet computers. Such handhelds usually also comprise a visual sensor (camera), a computer (processor) and a display (screen).

According to the invention, the computer is configured to receive or to store the AR-data and identification features assigned to a plurality of reference systems. For the receiving functionality, the AR-device may comprise a wireless communication unit (using e.g. WiFi, Bluetooth, radio link, etc.) for connecting to, communicating with, and transferring data from/to a server. For the storing functionality, the AR-device may comprise a data storage unit, such as a hard disk or a removable storage card.

The visual sensor is configured to visually capture the environment. When the visual sensor has captured at least one identification feature, the computer is capable (due to its configuration) of identifying a corresponding reference system to which the captured identification feature(s) is/are assigned. The computer is further configured to determine a pose of the AR-device relative to the identified reference system, and thereby to establish a referenced status.

The computer is configured to maintain the referenced status based on a Visual Simultaneous Localisation and Mapping (VSLAM)-process, even in case of loss of visual contact between the visual sensor and the at least one identification feature, e.g. when the at least one identification feature is not visible to the visual sensor (e.g. because it is outside the field of view, or occluded by another object).

The AR-device may further comprise a position and orientation sensor (pose sensor) configured to provide position and orientation data (pose data) for supporting the VSLAM-process. Such position and orientation sensors are for example Inertial Measuring Units (IMU), gyroscopes, magnetometers, accelerometers, a Global Navigation Satellite System (GNSS) sensor and so on. The computer and the visual sensor are configured and interact to perform such VSLAM process.

Figure 3:
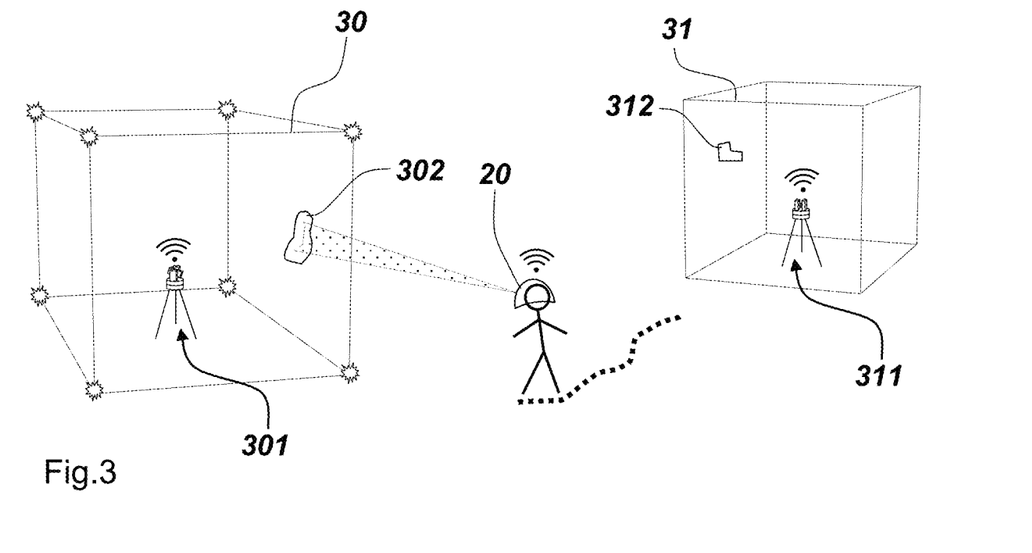
FIG. 3: shows a first exemplary AR-system according to the invention.

FIG. 3 shows an environment (e.g. a construction site) comprising an embodiment of the inventive AR-system. The AR-system comprises a first reference system 30 having an identification feature 302 and being defined and/or erected by a surveying instrument 301. The AR-system also comprises a second reference system 31 having an identification feature 312 and being defined and/or erected by a surveying instrument 311. In particular, the surveying instruments respectively gather surveying data (e.g. point clouds) of their environment and store them relative to their reference system. Thereby, literally all surveyed data may function as identification features as long as the visual sensor of the AR-device 20 is able to recognise them.

In the shown situation, the user wearing the AR-device 20 is facing towards the reference system 30, whereby the visual sensor of the AR-device is capturing an identification feature 302 of which the pose is known relative to the reference system 30. The identification feature 302 may for example be a QR-code marker, a physical feature of the environment represented by image data or a three-dimensional point cloud, or a combination of landmarks such as corners of rooms or windows, wherein the position of said landmarks are known relative to the reference system. By processing captured images of the identification feature, the computer of the AR-device is capable of determining the pose of the AR-device relative to the reference system, thereby establishing a referenced status.

In particular, the surveying instruments 301, 311 can wirelessly provide AR-data to the AR-device, wherein such AR-data may be measured data surveyed with the surveying instrument, or image data captured with a camera comprised by the surveying instrument.

The dashed line in the figure indicates a travel path the user is intended to walk towards the second reference system 31.

Figure 4:
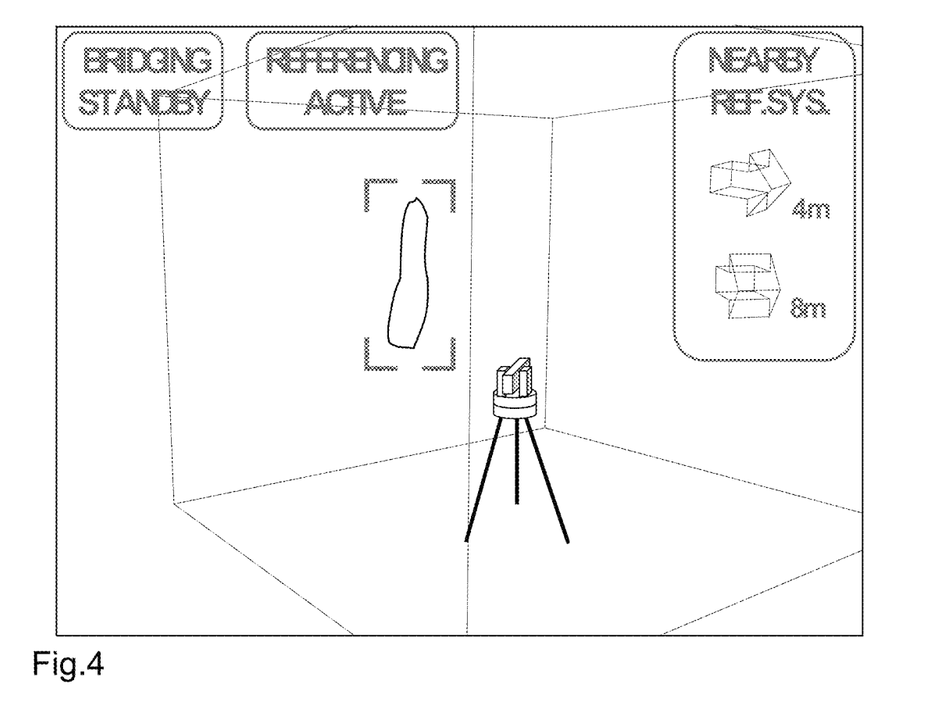
FIG. 4: shows a first exemplary AR-system according to the invention.

FIG. 4 shows a first person view (FPV) of the user when standing at the position shown in FIG. 3. An optional overlay is indicating that the referencing functionality is active due to at least one known identification feature being visible to the visual sensor of the AR-device.

A further optional overlay is an indication that the bridging functionality is in standby, which means that the maintenance of the referenced status—independent from the identification feature and instead based on a VSLAM-process—is on hold, because at least one identification feature is still captured by the visual sensor.

As soon as the visual sensor loses track of any identification feature, the bridging functionality is active (FIGS. 5 and 6) and keeps the referenced status upright. The bridging functionality may continuously run in the background, and only take over once the identification feature(s) is/are out of sight.

Figure 5:
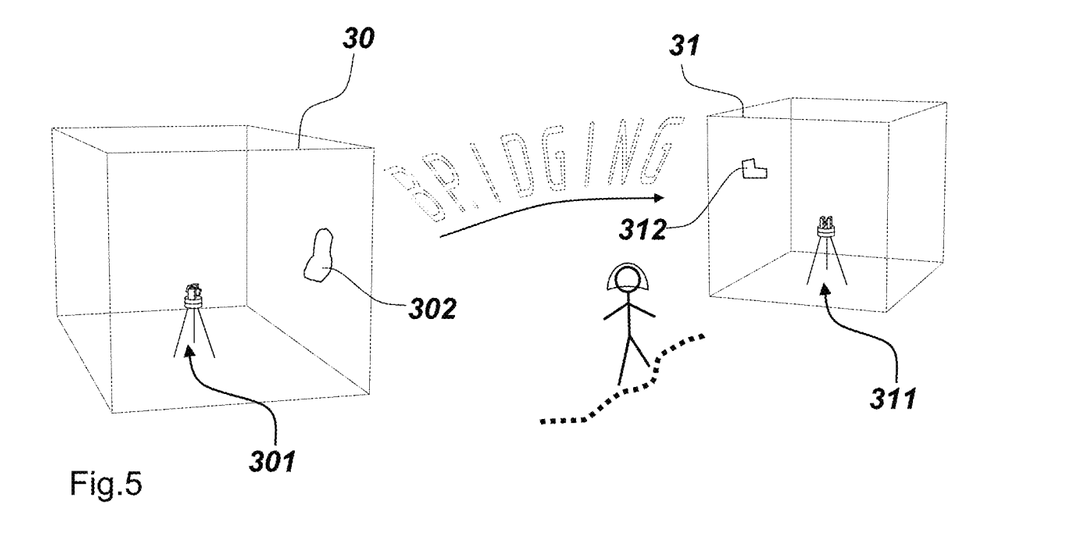
FIGS. 5-8: show an exemplary method according to the invention.
Figure 6:
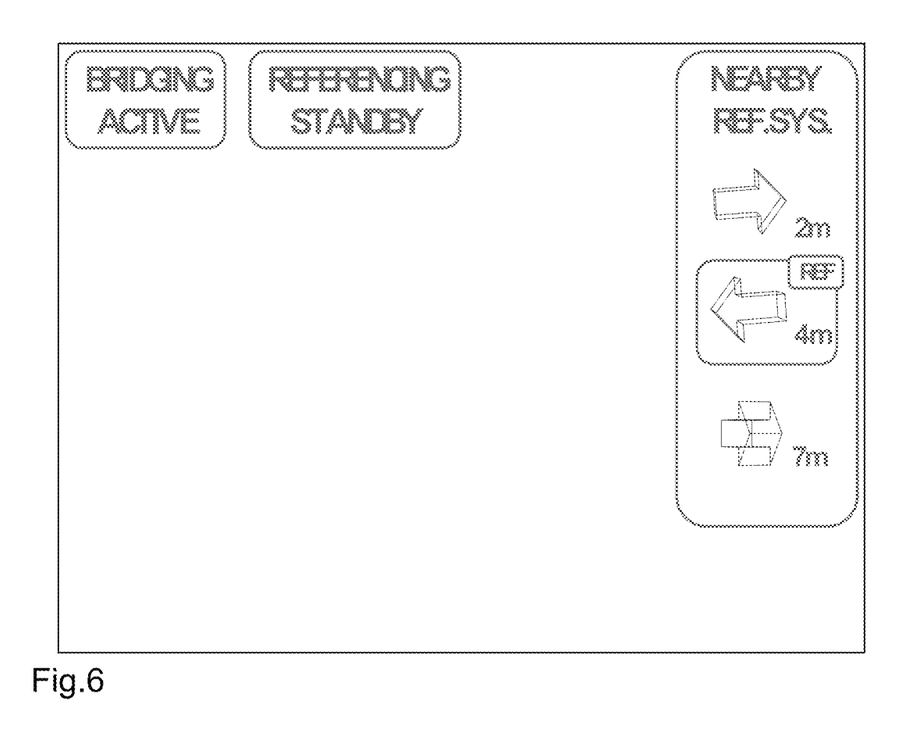

A "classical" referencing is hence not performable anymore, which is why the optional overlay may now read "standby". The bridging functionality maintains the referenced status however. One purpose of maintaining the referenced status by bridging may be an uninterrupted provision of display of referenced AR-data.

This is accomplished by a VSLAM-process which uses image data captured by the visual sensor of the AR-device. The structure of the environment thereby provides spatial referencing making it possible to determine a pose of the AR-device relative to the reference system that the AR-device most recently referenced itself to. As depicted in FIG. 6, a further optional overlay may be displayed which is indicating where to find the reference system the AR-device is referenced to (framed arrow tagged with "REF"). For example, such indications may be a distance specification and/or a direction arrow, in particular a three-dimensional arrow. This further optional overlay provides orientation aid for the user, helping him to find back the reference system, or its identification features, to obtain a "classical" referencing once again or just to show AR-data linked to said reference system.

If the spatial relationship between several reference systems is known already and/or stored within the AR-system (on a cloud server or on a memory unit of AR-device), the pose of the AR-device relative to the origins of the several reference systems or relative to identification features in the several reference systems may also be determined and displayed (arrow above and below the framed arrow).

Figure 7:
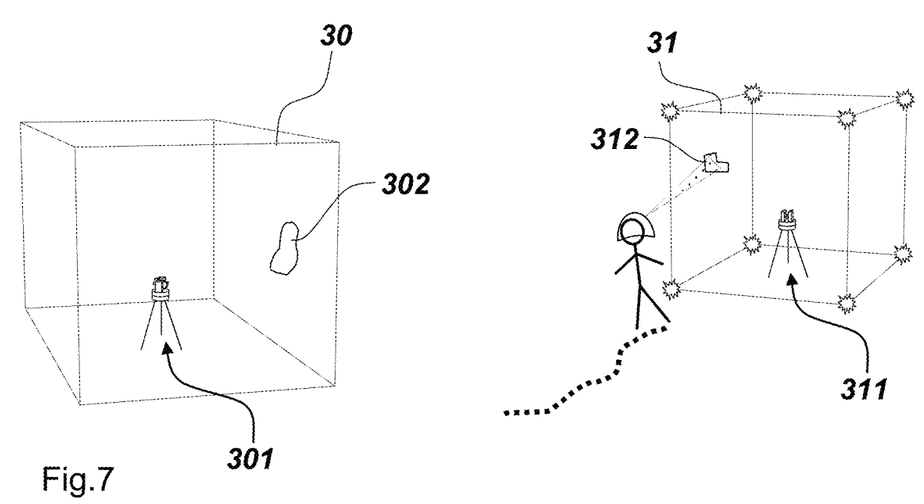
Figure 8:
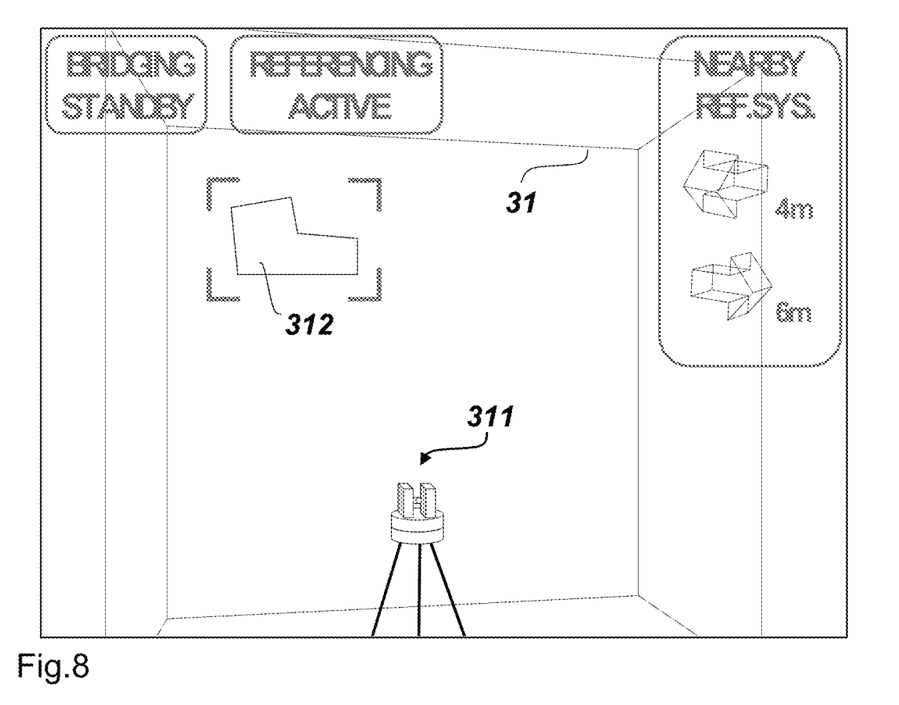

FIGS. 7 and 8 show the user of the AR-device and his view when arrived at the second reference system. Once identification features have been detected, the AR-device is maintaining the referenced status by determining a pose of the AR-device relative to the second identification feature(s). Here, the referenced status relates to only the second reference system 31 while discarding the first reference system, or it relates to the first and second reference system simultaneously.

If a spatial relationship between the first and second reference system has not been known yet, the AR-device can "teach" such relationship. In other words, the AR-system can "learn" the interrelated first and second reference system from the AR-device: All along the travel path of the user and up until "arrival at" (detection of) the second reference system 31, the AR-device maintained its referenced status with regard to the first reference system 30 by "bridging" based on a VSLAM-process. Once referenced (as well) to the second reference system 31, the spatial relationship, i.e. the relative pose delta between the first and second reference system is determined. From then on, AR-data linked to the first reference system may also be displayed when the user is looking in the direction of the first reference system while standing apart from the first reference system and e.g. close to the second reference system. This "linking" functionality of at least two reference systems, whose spatial relationship is not known a priori, may be coarse and not very precise, however, it might be good enough for guiding or navigating the user to identification features within a network of reference systems.

Although the invention is illustrated above, partly with reference to some preferred embodiments, it must be understood that numerous modifications and combinations of different features of the embodiments can be made. All of these modifications lie within the scope of the appended claims.

The invention claimed is:

1. An Augmented Reality (AR)-device comprising:
 a visual sensor configured for capturing an environment of the AR-device,
 a display configured for providing:
  a real view of the environment, and
  overlays onto the real view according to AR-data, wherein the AR-data comprise at least one of design data and measured data,
 a computer configured for:
  reading and controlling the visual sensor,
  at least one of receiving, generating and storing
   the AR-data, and
   identification features which are assigned to each of
    a plurality of reference systems, wherein
     each reference system is defined by a surveying instrument being one of a total station, a theodolite, a tachymeter, a laser scanner, or a laser tracker, and the identification features are generated and provided to the AR-device by the surveying instrument of the corresponding reference system, generating the overlays, and establishing a referenced status of the AR-device relative to each of the reference systems in each case by:
identifying a reference system based on at least one identification feature captured by the visual sensor, and
determining a pose of the AR-device relative to the identified reference system, wherein the computer is further configured for
maintaining the referenced status in case of loss of visual contact between the visual sensor and the at least one identification feature, based on a Visual Simultaneous Localization and Mapping (VSLAM)-process.

2. The AR-device according to claim 1, wherein the VSLAM-process and establishing the referenced status are based at least on the output of the visual sensor.

3. The AR-device according to claim 1, further comprising:
a position and orientation sensor configured to provide position and orientation data for the computer, wherein the VSLAM-process is further based on the position and orientation data.

4. The AR-device according to claim 1, wherein the identification features comprise surveyed data.

5. An Augmented Reality (AR)-system comprising
an AR-device comprising:
a visual sensor configured for capturing an environment of the AR-device,
a display configured for providing:
a real view of the environment, and
overlays onto the real view according to AR-data, wherein the AR-data comprise at least one of design data and measured data,
a computer configured for:
reading and controlling the visual sensor,
at least one of receiving, generating and storing:
(i) the AR-data, and
(ii) identification features which are assigned to each of a plurality of reference systems,
generating the overlays,
establishing a referenced status of the AR-device relative to each of the reference systems in each case by:
(i) identifying a reference system based on at least one identification feature captured by the visual sensor, and
(ii) determining a pose of the AR-device relative to the identified reference system, and
maintaining the referenced status in case of loss of visual contact between the visual sensor and the at least one identification feature, based on a Visual Simultaneous Localization and Mapping (VSLAM)-process; and
at least two surveying instruments, each defining one of the plurality of reference systems,
wherein:
each surveying instrument is one of a total station, a theodolite, a tachymeter, a laser scanner, or a laser tracker; and
the identification features are generated and provided to the AR-device by the surveying instrument of the corresponding reference system.

6. The AR-system according to claim 5,
wherein the at least two surveying instruments are configured to generate and provide the AR-data to the AR-device.

7. The AR-system according to claim 5,
wherein the identification features are one or more of
image data,
a coded marker pattern, or
landmark coordinates.

8. A method for establishing and seamlessly bridging a referenced status of an Augmented Reality (AR)-device, the method comprising:
capturing an environment of the AR-device using a visual sensor of the AR-device;
at least one of receiving, generating and storing identification features which are assigned to each of a plurality of reference systems
wherein
each reference system is defined by a surveying instrument being one of a total station, a theodolite, a tachymeter, a laser scanner, or a laser tracker and
the identification features are generated and provided to the AR-device by the surveying instrument of the corresponding reference system,
generating overlays onto a real view of the environment displayed on a display of the AR-device, wherein the AR-data comprise at least one of design data and measured data;
establishing a referenced status of the AR-device relative to each of the reference systems in each case by:
identifying a reference system based on at least one identification feature captured by the visual sensor, and
determining a pose of the AR-device relative to the identified reference system;
identifying a first reference system based on at least one of first identification features captured by the visual sensor;
establishing a referenced status of the AR-device with respect to the first reference system; and
based on a Visual Simultaneous Localiszation and Mapping (VSLAM)-process, maintaining the referenced status even in case none of the at least one first identification feature is visible to the visual sensor.

9. The method according to claim 8, further comprising:
identifying a second reference system based on at least one of second identification features captured by the visual sensor, and
by determining a pose of the AR-device relative to the second identification feature, establishing a referenced status of the AR-device with respect to the second reference system.

10. The method according to claim 9, further comprising:
spatially interrelating the first identification features of the first reference system with the second identification features of the second reference system by generating according transformation parameters.

11. The method according to claim 10, further comprising generating an indication based on
at least one of the first identification features, or at least one of the second identification features,
the position of the origin of the first reference system or of the second reference system, and
providing the indication on the display of the AR-device.

12. The method according to claim 11,
wherein the indication comprises at least one of
- an arrow pointing in the direction of an according origin of a reference system or in the direction of an identification feature assigned to an according reference system, and
- a distance value of the distance between the AR-device and an according origin of a reference system or of the distance between the AR-device and an identification feature assigned to an according reference system.

13. The method according to claim 10,
wherein generating the transformation parameters is based on the VSLAM-process.

14. The method according to claim 13, wherein the referenced status with respect to the first reference system is maintained even in case none of the first identification features is visible to the visual sensor, and wherein the referenced status with respect to the second reference system is maintained even in case none of the second identification features is visible to the visual sensor.

15. The method according to claim 13,
wherein at least one of
- determining the pose of the AR-device relative to the first identification features, and
- determining the pose of the AR-device relative to the second identification features comprises using an image processing algorithm from photogrammetry or computer vision, in particular using a VSLAM-process.

16. The method according to claim 13,
wherein at least one of
- determining the pose of the AR-device relative to the first identification features and
- determining the pose of the AR-device relative to the second identification comprises using supportive position and orientation data obtained by the position and orientation sensor comprised by the AR-device.

\* \* \* \* \*